US007139863B1

(12) United States Patent
Defouw et al.

(10) Patent No.: US 7,139,863 B1
(45) Date of Patent: Nov. 21, 2006

(54) METHOD AND SYSTEM FOR IMPROVING USABLE LIFE OF MEMORY DEVICES USING VECTOR PROCESSING

(75) Inventors: Richard John Defouw, Boulder, CO (US); Thai Nguyen, Thornton, CO (US)

(73) Assignee: Storage Technology Corporation, Louisville, CO (US)

(*) Notice: Subject to any disclaimer, the term of this patent is extended or adjusted under 35 U.S.C. 154(b) by 474 days.

(21) Appl. No.: 10/672,786

(22) Filed: Sep. 26, 2003

(51) Int. Cl.
*G06F 12/00* (2006.01)
(52) U.S. Cl. .................. 711/103; 711/165; 365/185.33
(58) Field of Classification Search ................. 711/103, 711/165; 365/185, 185.33
See application file for complete search history.

(56) References Cited

U.S. PATENT DOCUMENTS

| 5,568,423 | A | * | 10/1996 | Jou et al. ............... 365/185.33 |
| 6,000,006 | A | * | 12/1999 | Bruce et al. ................ 711/103 |
| 6,122,195 | A | | 9/2000 | Estakhri et al. ........ 365/185.11 |
| 6,230,233 | B1 | * | 5/2001 | Lofgren et al. ............. 711/103 |
| 6,301,635 | B1 | | 10/2001 | Bothwell et al. ........... 711/103 |
| 6,381,176 | B1 | | 4/2002 | Kim et al. ............. 365/185.11 |
| 6,732,221 | B1 | * | 5/2004 | Ban ........................... 711/103 |
| 6,831,865 | B1 | * | 12/2004 | Chang et al. .......... 365/185.33 |
| 6,944,063 | B1 | * | 9/2005 | Chen et al. ............ 365/185.33 |
| 6,973,531 | B1 | * | 12/2005 | Chang et al. ................ 711/103 |

* cited by examiner

*Primary Examiner*—Pierre Bataille
*Assistant Examiner*—Sheng-Jen Tsai
(74) *Attorney, Agent, or Firm*—Brooks Kushman P.C.

(57) ABSTRACT

A method, system and apparatus for improving the useful life of non-volatile memory devices such as flash memory. The present wear-leveling technique advantageously improves the overall useful life of a flash memory device by strategically moving inactive data (data that has been infrequently modified in the recent past) to the memory blocks that have experienced the most wear since the device began operation and by strategically moving active data to the memory blocks that have experienced the least wear. In order to efficiently process and track data activity and block wear, vectors of block-descriptor pointers are maintained. One vector is sorted in decreasing order of overall block erase/write activity (block-wear indicator), whereas the other vector is sorted in increasing order of the number of times a block has been erased since the last wear-leveling event occurred (activity indicator for the data stored in the block). The activity levels of the data and the wear levels of the blocks are then easily compared and otherwise processed using pointers into these vectors to allow for more efficient processing than previous techniques used for wear leveling.

24 Claims, 7 Drawing Sheets

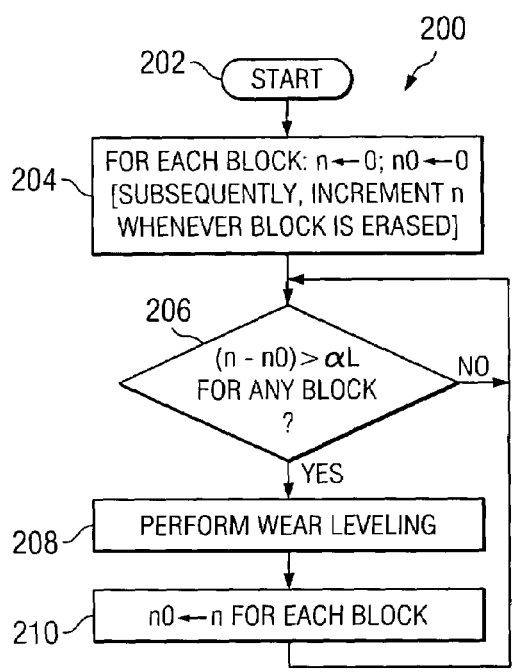
*FIG. 2*
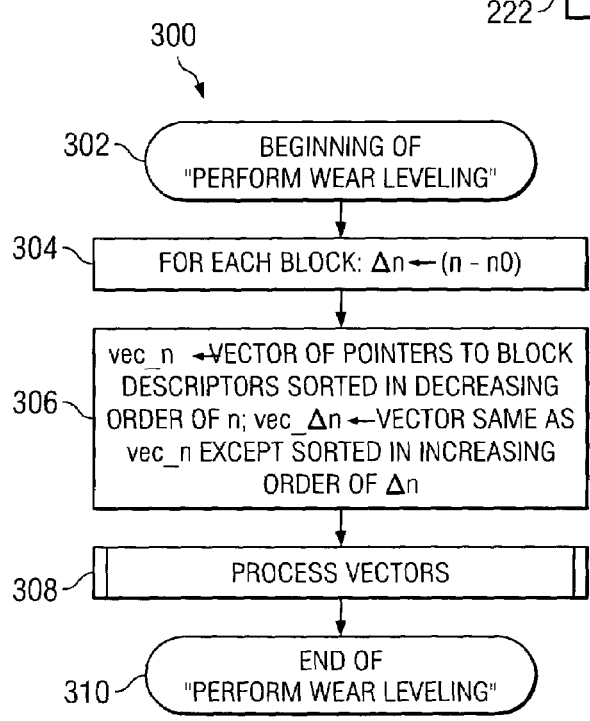
*FIG. 3*
| 224 | 226 | 228 |
|---|---|---|
| n(0) | n0(0) | Δn(0) |
| n(1) | n0(1) | Δn(1) |
| n(2) | n0(2) | Δn(2) |
| n(3) | n0(3) | Δn(3) |
| n(4) | n0(4) | Δn(4) |
| n(5) | n0(5) | Δn(5) |
| ⋮ | ⋮ | ⋮ |
| n(122) | n0(122) | Δn(122) |
| n(123) | n0(123) | Δn(123) |
| n(124) | n0(124) | Δn(124) |
| n(125) | n0(125) | Δn(125) |
| n(126) | n0(126) | Δn(126) |
| n(127) | n0(127) | Δn(127) |
*FIG. 4*

METHOD AND SYSTEM FOR IMPROVING USABLE LIFE OF MEMORY DEVICES USING VECTOR PROCESSING

BACKGROUND OF THE INVENTION

1. Field of the Invention

The present invention relates to data storage devices, and in particular relates to improved techniques for using and managing non-volatile memory storage devices to enhance lifetime characteristics of such devices.

2. Background of the Invention

Memory devices are a key component in today's computer systems, allowing high-speed access to retrieve and store data. A certain type of memory device known as non-volatile memory maintains the correct data value stored in the device even when power is removed from the device. Because non-volatile memory devices are more expensive than volatile memory devices (which lose data when removed from a power source), their use in a computer system is typically limited to situations where a need exists to maintain data even when power is removed or lost. For example, configuration settings for a computer are typically stored in non-volatile memory so that the system properly boots-up in a proper state when powered-up. These configuration settings may include the number and type of peripheral devices that are attached to a computer, the current date/time, power management settings, etc. Another use of non-volatile memory in a computer system is to store the initial boot-up code that gets executed when the computer is first turned on. This initial code, sometimes called BIOS when discussing personal computers, provides the computer with enough programming capability to allow it to initialize a computer and read an operating system from a storage device such as a hard disk.

Technological advances and volume production have driven the cost of such non-volatile storage devices down so that other types of devices, such as consumer devices, can now cost-effectively include and utilize non-volatile memory for their own advantage. Cellular telephones can be programmed to store phone lists, for example. Digital cameras store snapped photographs in non-volatile memory devices. Music devices such as MP3 players also use non-volatile memory to store music. Because of the reduction in price of these non-volatile memory devices due to volume production, it is now possible to envision use of these devices in mass data storage systems, in lieu of or in addition to disk arrays or tape library systems.

One type of non-volatile memory device is known as an electrically erasable and programmable read only memory (EEPROM), which is a particular type of integrated circuit (IC) device. Another integrated circuit non-volatile memory device is a non-volatile random access memory (NVRAM), which is a combination of static RAM (SRAM) and EEPROM. These devices are made up of an array of cells which store data bits that have been programmed into the device. The EEPROM device is programming by providing particular voltages to certain portions of transistors (such as gate, drain and source terminals) that are used in each cell. The device is read by providing particular, but different, voltages to certain portions of transistors. It is also possible to erase the content of a cell by applying a particular voltage to an erase gate. Similarly, a NVRAM is written to by writing data into the device using conventional SRAM writing techniques, and the SRAM data is copied to the EEPROM when power is removed in order to maintain the data in the EEPROM when no power exists.

A large number of cells are typically configured to form a non-volatile memory device. They may be fashioned in a two-dimensional array, with each cell being individually addressable for reading or writing. However, to reduce design complexity (and cost), groups of cells share certain common control lines for erasing the cell. The cells that share a common erase control are typically called a block of cells, or a block. Block sizes can be any size as dictated by a given design, and may be 128 bits, 256 bits, 1024 bits, etc. All the bits in a block are erased at the same time during an erase operation using the common erase control line, and this is sometimes referred to as erasing 'in a flash'. Because of this, certain non-volatile memory such as EEPROM that is erased and reprogrammed at the block level (as opposed to a byte level) has become known as flash memory.

In what follows the term "physical block" refers to a block in the sense just described; that is, a physical block is the smallest group of cells of flash memory that can be erased or rewritten at one time. A "logical block," on the other hand, refers to the data that is stored in a physical block. To simplify the explanations, an empty physical block is regarded as a physical block that contains a logical block that has never been modified.

Certain non-volatile memory devices such as EEPROM age over time, and thus have a limit on the number of times they can be re-programmed. This 'aging' is not necessarily caused by how old the device is, but rather by how many times the device has been written to. Each physical block has a finite lifetime in terms of the number of erase/write cycles that it can undergo. For present flash memory technology, this endurance limit is approximately 100,000 to 1,000,000 cycles. Because of this limitation, the useful life of a flash memory terminates as soon as one physical block has reached its endurance limit (unless spare blocks have been held in reserve). For many consumer applications, this relatively large number is generally not an issue. However, when these devices are used in applications having a large amount of input and output operations—such as when used in conjunction with or in lieu of a disk or tape subsystem—it does become an issue.

In those applications where the endurance limit does pose a significant restriction on the lifetime of the device, the lifetime of the device can be extended by taking steps to ensure that wear is distributed more evenly over all the physical blocks. To cite an extreme example, if only one logical block is modified frequently and no steps are taken to redistribute the wear, the useful lifetime of the device terminates as soon as the physical block containing the mentioned logical block reaches the endurance limit. However, if the active logical block is moved from one physical block to another at suitable intervals, the lifetime of the memory can be multiplied by the number of physical blocks in the flash memory. This illustrates the wear-leveling method for memory extension. The problem is to devise a wear-leveling algorithm that can be relied upon to distribute wear more evenly, with acceptable overheads, under conditions that can be expected to arise in practice.

One approach to wear leveling for flash EEPROM systems is described in U.S. Pat. No. 6,230,233. The EEPROM array is divided into two or more interchangeable banks of physical blocks. A memory controller provides for interchanging the banks when it is detected that they are receiving significantly uneven use. However, this technique is deficient in several respects (the following critique refers to individual physical blocks rather than banks merely for simplicity):

1. The choice of logical blocks to be moved in a wear-leveling operation is based on the cumulative wear of a given physical block, which depends on all the logical blocks that have resided in that physical block since the device began operation; the activity level of the logical block currently stored in the physical block is thereby obscured, leading to suboptimal decisions. For example, it would be desirable to populate the most worn physical block with the least active logical block, but the logical block currently residing in the least worn physical block (i.e., the physical block with the smallest cumulative wear) is not necessarily the least active logical block.

2. Wear-leveling operations can be counterproductive if they are performed too frequently: a logical block that is frequently modified and has been moved from a physical block with high wear to a physical block with low wear may be moved back to the physical block with high wear.

In view of these deficiencies in the technique taught in U.S. Pat. No. 6,230,233, it would be desirable to provide a wear-leveling technique for non-volatile memory devices that could be relied upon to yield satisfactory results with greater consistency.

SUMMARY OF THE INVENTION

The present invention is a method, system and apparatus for improving the useful life of non-volatile memory devices such as flash memory. The present wear-leveling technique advantageously improves the overall useful life of a flash memory device by strategically moving inactive logical blocks (logical blocks that have been infrequently modified in the recent past) to the physical blocks that have experienced the most wear (the greatest number of erasures) since the device began operation and by strategically moving active logical blocks to the physical blocks that have experienced the least wear. To track the activity of both physical blocks and logical blocks, a block descriptor is maintained for each physical block. One component of the block descriptor, denoted by n, is the total number of times the physical block has been erased since the device began operation; this component measures the cumulative wear on the physical block. Another component of the block descriptor, denoted by $\Delta n$, is the number of times the physical block has been erased since the most recent wear-leveling event; since logical blocks are moved only during wear-leveling events, this component measures the activity of the logical block that is currently stored in the physical block.

The information processing required to support wear leveling employs two vectors that contain the same elements but in different orders. The elements of each vector are pointers to all the block descriptors. One vector is sorted in decreasing order of the cumulative wear (n), while the other vector is sorted in increasing order of recent activity ($\Delta n$). These two vectors contain all the information that is required for effective wear leveling. Furthermore, this information is organized in such a way that the most promising opportunities for wear leveling can easily be identified by comparing elements of the two vectors as these vectors are traversed (using pointers into the vectors) in accordance with a suitable algorithm.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a top level diagram of wear level processing for non-volatile memory devices.

FIG. 3 shows more details of the process flow for performing wear leveling. It is an expansion of the "perform wear leveling" step 208 in FIG. 2.

FIG. 4 depicts a representative block descriptor table containing a plurality of block descriptors.

DETAILED DESCRIPTION OF THE PREFERRED EMBODIMENT

A technique for leveling the wear of a non-volatile integrated circuit device will increase the life of the device by monitoring storage patterns of the device and relocating certain data to other storage locations based on the activity level of the data and the cumulative wear of the storage locations. The technique works particularly well for EEPROM devices such as flash memory, but the techniques can also be used with other types of non-volatile storage devices such as Ovionics Unified Memory (OUM) and Magnetoresistive RAM (MRAM). As used herein, wear-leveling or a wear-leveling event is the process of moving one or more logical blocks from one physical location to another to more evenly distribute the wear of a non-volatile storage device.

Flash memory comes in many different sizes such as 64 Mbit, 128 Mbit, 256 Mbit, 512 Mbit and 1 Gbit. Technological advances will soon result in even higher storage densities for flash memory. For purposes of the preferred embodiment described herein, a representative flash memory device having a capacity of 128 Mbit and a block size of 128 Kbyte will be shown. However, devices having other device geometries such as different capacities and block sizes can also take advantage of the wear level techniques described herein, and are well within the scope of the present invention.

One key aspect of the present invention is the use of sorted lists or vectors to keep track of memory storage usage patterns. These vectors facilitate the identification of promising opportunities for wear leveling. Logical blocks that are infrequently erased/written can be moved into physical blocks that have received a lot of wear, while logical blocks that are frequently erased/written can be moved into physical blocks that have received little wear, thereby leveling the future wear of the individual physical blocks within the flash memory device.

Figure 1:
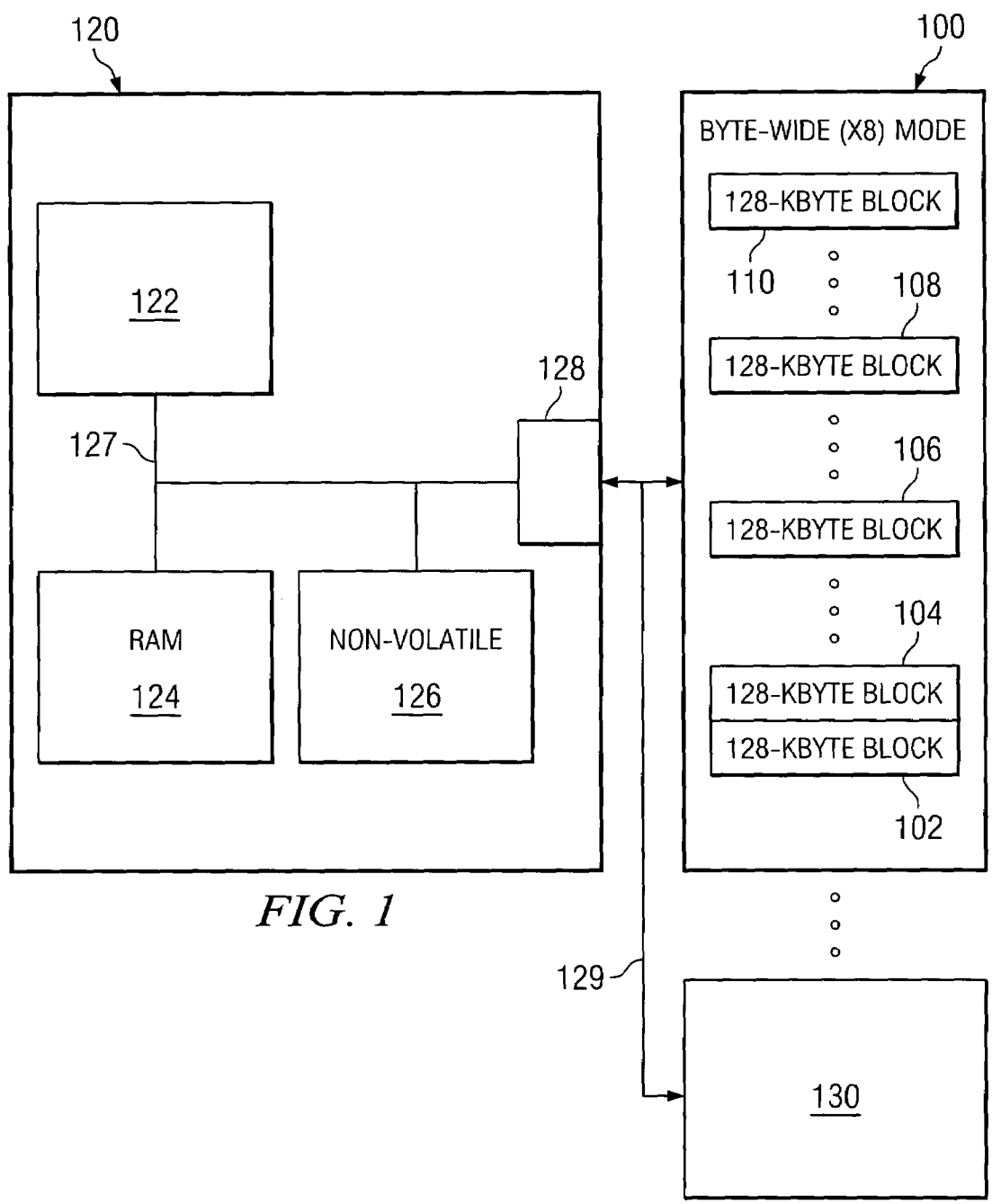
FIG. 1 depicts a system including a memory controller and one or more non-volatile memory devices.

Referring now to FIG. 1, there is shown a representative internal architecture of a flash memory device 100. In this particular example, the flash memory device has a total storage capacity of 128 Mbit organized as one hundred and twenty eight 128-Kbyte physical blocks (shown by representative physical blocks 102, 104, 106, 108 and 110). Physical block 0 (shown at 102) has an address range of x'000000'–x'01FFFF', physical block 1 (shown at 104) has an address range of x'020000'–x'03FFFF', physical block 31 (shown at 106) has an address range of x'3E0000'–x'3FFFFF', physical block 63 (shown at 108) has an address range of x'7E0000'–x'7FFFFF', and physical block 127 (shown at 110) has an address range of x'FE0000'–x'FFFFFF'. The other physical blocks are not shown for ease of clarity in understanding the organization of the flash memory device. The physical blocks are organized in a byte-wide (x8) fashion in this example. The present invention keeps track of data access at the block level in the preferred embodiment.

Also shown in FIG. 1 is memory controller 120, which contains a CPU or processor 122 coupled to controller memory 124 via bus 127. A non-volatile memory cache 126 also coupled to bus 127 is used as a temporary storage area in the wear-leveling technique described below. Memory cache 126 can also be used for receiving updates to the flash memory 100, which allows multiple updates to the flash to be captured during interim processing without actually updating the flash until the overall process has completed. This mitigates additional wear to the flash memory that would otherwise occur as part of the wear-leveling technique. Bridge/driver circuit 128 is used to connect internal bus 127 to external bus 129, where one or more flash memory devices 100 can be attached and controlled by controller 120.

While a single flash memory device 100 is shown in detail in this figure for simplicity, numerous other flash devices such as 130 can be included for systems requiring more memory, such as when used in conjunction with or in lieu of a disk array or tape library system. Memory controller 120 is typically installed as part of a larger computer system (not shown) such as a server or other type of data processing system. The techniques described herein could also be implemented in a hardware macro or similar circuitry that is included as part of the flash memory device itself, thus providing improvements in flash memory lifetime for both high and low-end applications. The block wear-leveling technique for flash memory devices will now be described.

Referring now to FIG. 2, there is shown a top-level flow chart of the present wear-leveling technique 200. This process is executed on memory controller 120 of FIG. 1 in the preferred embodiment, but could also be run in other parts of the overall system. The wear level technique starts at 202, and proceeds to step 204, where variables n and n0 are initialized to a zero (0) value. As used herein, the variable n maintains a count of the total number times a given physical block has been erased. The variable n0 is used to store the value of n for a given physical block at the time the last wear-leveling event occurred, as described below in connection with step 210. There is a separate n variable and no variable for each physical block. For this example, with 128 physical blocks, there will be 128 n variables and 128 n0 variables. Also shown in step 204 is the incrementing of variable n by one each time its associated physical block is erased. In step 206, a couple of other variables are used. α is a number much less than one, and a value in the neighborhood of 0.01 has been determined to be effective for the present invention. L is the endurance limit for a given physical block, or the maximum number of erase cycles that the flash device is specified to handle by the device manufacturer. For example, many of today's flash devices are spec'ed at 100,000 or 1,000,000 erase/write cycles. Exceeding this number is not recommended by the manufacturer in order to ensure reliable operation. α multiplied by L (shown in FIG. 2, step 206 as αL) is thus a threshold value used to determine if a wear leveling operation needs to be performed. So, in step 206, a determination is made on whether the total erase cycles for any physical block minus the number of erase cycles since the last wear leveling operation was performed (n–n0) exceeds the wear level threshold. For example, assume α is 0.01 and L is 100,000, a determination is made at step 206 whether any physical block has been erased more than 1,000 times (0.01 times 100,000) since the last wear leveling event. If so, a wear leveling operation is performed at step 208, as will be described in more detail below. After a wear leveling operation has been performed at step 208, the variable n0 for each physical block is set to the current value n for that physical block in order to save the value of n at the time of this wear-leveling event. This completes the wear-leveling operation, and the next wear-leveling operation is not initiated until some physical block experiences another 1,000 erasures (1,000 being the value of αL in our example), as indicated by the test in step 206.

It is to be noted that the test in step 206 does not refer to the unevenness in the wear distribution, but rather to the largest amount of wear experienced by any physical block in the interval since the most recent wear-leveling operation. While the present invention is concerned primarily with the mechanism of the wear-leveling operation itself, this method for deciding when a wear-leveling operation should be initiated illustrates an effective approach, and an approach that guarantees that a significant amount of wear (in fact, any desired level of wear) occurs between successive wear-leveling operations. While this approach can introduce unnecessary wear in environments where unevenness in the wear distribution is not a problem, this overhead wear is small owing to the smallness of the parameter α.

A wear-leveling operation (generally shown at step 208 in FIG. 2) proceeds as shown at 300 in FIG. 3. The first step is to compute the number of times each physical block has been erased since the previous wear-leveling event. This number is called Δn and is equal to n–n0, as indicated at 304. For each physical block, we therefore know its cumulative wear since the device began operation (n) and its wear since the previous wear-leveling event (Δn).

A block descriptor is maintained in the memory controller's memory (element 124 of FIG. 1) for each physical block, and is used to store the variables n, n0, and Δn associated with a given physical block (such as physical block 102 in FIG. 1). A representative table of block descriptors is shown at 220 in FIG. 4, and comprised a plurality of block descriptors 222, one for each physical block of flash memory. Each block descriptor maintains values for n, n0 and Δn. For example, item 224 is the n value for physical block 0, item 226 is the n0 value for physical block 0, and item 228 is the Δn value for physical block 0. Of course, since Δn is determined using n and n0, in an alternate embodiment Δn is not separately maintained in the block descriptor table but rather dynamically computed using n and n0 when needed.

In addition to the values of n, n0, and Δn, a block descriptor may contain other information. One piece of additional information that is needed in some implementations of the present invention is the block ID of the logical block that is stored in the physical block.

In order to accommodate power failures to memory controller 120, the block descriptors could be stored in the non-volatile memory cache 126 instead of the volatile memory 124. However, this would have the undesirable effect of reducing the amount of non-volatile memory that is available for use as a write cache. For this reason, it is preferable to store the block descriptors in the volatile memory 124, but to protect against power failures in the following way. Each physical block contains or includes, in addition to the user data (the logical block), a header where metadata is stored. The value of n for the physical block is stored in this header. This procedure requires a few bytes of each physical block to store the value of n, of course, but it introduces no wear overhead because the value of n can be incremented at the same time this physical block is re-written. The value of n for each physical block is therefore always available in the non-volatile flash memory 100 (FIG. 1). If a power failure should occur, we do lose the values of n0 and $\Delta n$, but this is a relatively minor loss. We simply set n0 for each physical block to its current value of n, so it is as if a wear-leveling event has just completed; the value of $\Delta n$ is calculated as usual at the time of the next wear-leveling event. Thus, the impact of a power failure with this protection scheme is no more serious than skipping a single wear-leveling event.

The value of n for a physical block should be incremented and (in the preferred embodiment) stored in the block header each time the physical block is re-written. In the following description of the wear-leveling mechanism, it will be assumed that this is done not only at the time of re-writes initiated by the user of the data but also at the time of re-writes that are part of the wear-leveling process itself.

Once $\Delta n$ has been computed for each physical block at the beginning of a wear-leveling event (step 304 in FIG. 3), each block descriptor indicates the wear that has been experienced by the given physical block since the beginning of device operation (n) and the wear that has been experienced by the given physical block since the previous wear-leveling event ($\Delta n$). Since logical blocks are moved only during wear-leveling operations in the preferred embodiment, $\Delta n$ also characterizes the activity of the logical block that is currently stored in the physical block; this is the real significance of $\Delta n$ for the wear-leveling operation. The assumption is that the value of $\Delta n$ based on the activity of the logical block in the recent past (during the interval since the most recent wear-leveling event) will provide useful information, at least in a statistical sense, on the activity of that logical block in the future.

In general, wear leveling is achieved by moving relatively inactive logical blocks into physical blocks that have experienced the most wear to date and by moving relatively active logical blocks into physical blocks that have experienced comparatively little wear. The information required for these operations is contained in the block descriptors once the values of $\Delta n$ have been computed in step 304. This information is accessed most conveniently via pointers to the block descriptors. An ordered list of all the pointers to the block descriptors (one pointer for each physical block) will be called a vector. A key feature of the invention is the use of two vectors. One vector, denoted by vec_n, is sorted in decreasing order of n; that is, the first elements of vec_n point to the descriptors of the physical blocks with the largest values of n, and the last elements of vec_n point to the descriptors of the physical blocks with the smallest values of n. The other vector, denoted by vec_$\Delta n$, is sorted in increasing order of $\Delta n$; that is, the first elements of vec_$\Delta n$ point to the descriptors of the physical blocks with the smallest values of $\Delta n$, and the last elements of vec_$\Delta n$ point to the descriptors of the physical blocks with the largest values of $\Delta n$. The creation of the vectors vec_n and vec_$\Delta n$ by the memory controller 120 is indicated at 306.

In the present invention, the vectors vec_n and vec_$\Delta n$ play a central role in the determination of which data-movement operations are to be performed for the purpose of wear leveling (a data-movement operation being the relocation of a logical block from one physical block to another). The instruction "process vectors" at step 308 refers to the selection and execution of these data-movement operations under the guidance and control of the two vectors, as will be further described below. The wear-leveling process then ends at 310.

There is more than one way that the vectors can be processed at 308. One way is shown at 500 in FIG. 5 and another at 600 in FIG. 6; the latter way has its own variations because there is more than one way to expand step 608. These alternative implementations will now be described, beginning with the vector processing in FIG. 5.

Figure 5:
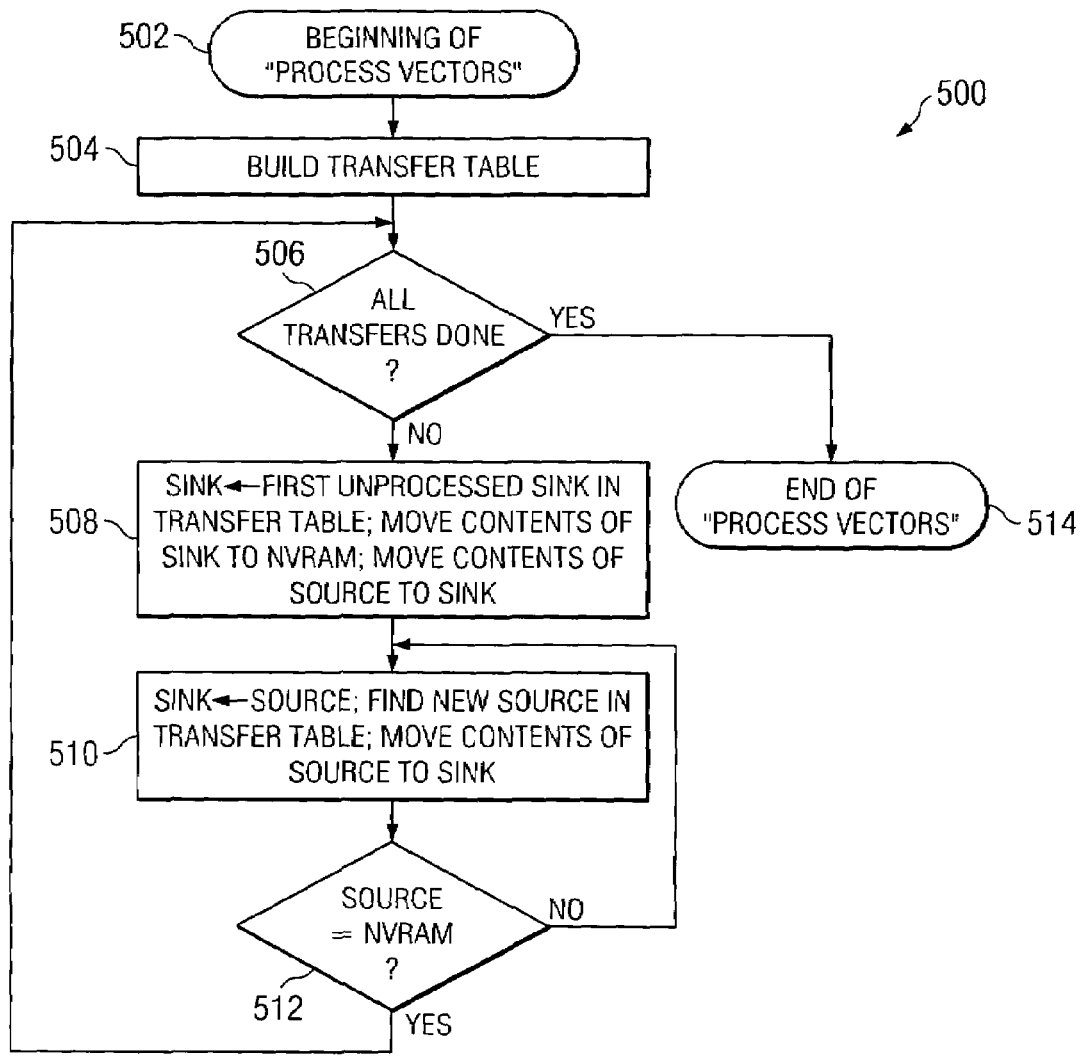
FIG. 5 shows one possible expansion of the "process vectors" step 308 in FIG. 3.

The algorithm shown in FIG. 5 is based on the observation that the vectors vec_n and vec_$\Delta n$ would be identical if the assignment of logical blocks to physical blocks were ideal from the standpoint of wear leveling. That is, the least active logical block (smallest value of $\Delta n$) would be stored in the physical block that has experienced the most wear to date (largest value of n), the second least active logical block would be stored in the physical block with the second most wear, and so forth. This means that optimum wear leveling can be achieved as follows: for each physical block, find its location in vec_$\Delta n$ (that is, find the element of vec_$\Delta n$ that points to the block descriptor of the given physical block) and move the logical block that is currently stored in this physical block to the physical block at the corresponding location in vec_n (that is, to the physical block whose descriptor is referenced by the corresponding element of vec_n). The algorithm in FIG. 5 is a practical way to perform these data movements without losing data and without using more than a minimal amount of non-volatile RAM.

The algorithm is entered at 502, and begins with the construction of a transfer table at 504. One column of the transfer table lists the physical blocks in the order in which they appear in vec_n (meaning, of course, the order in which their block descriptors are referenced by elements of vec_n), and the other column lists the physical blocks in the order in which they appear in vec_$\Delta n$. Thus, each row contains the identifiers of two physical blocks from the same locations in vec_n and vec_$\Delta n$. Any rows in which these two identifiers are the same are deleted from the table. Each remaining row identifies a transfer that is to be performed, that is, a relocation of a logical block from the physical block referenced in vec_$\Delta n$ to the physical block referenced in vec_n. For each such transfer, the physical block referenced in vec_$\Delta n$ will be called the source, and the physical block referenced in vec_n will be called the sink. When a transfer is performed, the associated row in the transfer table must be rendered inoperative, either by setting a flag or simply by deleting the row (the first alternative would require an additional column in the transfer table to hold the inoperative flag, but this column will not be mentioned again; in particular, this flag should not be confused with the "third column" mentioned below, which is used to hold a different flag).

In FIG. 5 "sink" and "source" are also used in the sense of variables that keep track of the sink and source for the current transfer. At 508 the sink variable is assigned to the first sink in the transfer table that has not yet received a new logical block. If a row specifying a transfer is deleted upon completion of the transfer, the assignment of the sink variable at 508 simply refers to the first remaining sink in the transfer table. The second step in 508 is to move the contents of the current sink to a temporary buffer in the non-volatile memory cache 126, which is called NVRAM in 508. The last step in 508 is to move the logical block in the current source to the sink.

The transfer table should include a third column to hold a flag for each row that indicates whether the logical block originally assigned to the source block in that row has been moved to the NVRAM. At any given time, at most one of these flags will indicate that the logical block is in the NVRAM. When a logical block in a sink is moved to the NVRAM in 508, the physical block currently serving as the sink must be located in the source column, so that the flag can be set in the appropriate row.

At the conclusion of 508, a transfer has been completed leaving a new logical block in the sink and no logical block left in the source. The next step is to move the appropriate logical block into this source. At 510, the physical block that was the source in the transfer just completed is now the sink of the next transfer. It is therefore necessary to locate the identifier of this physical block in the sink column of the transfer table. The physical block in the same row of the source column is the new source. The logical block in this source is then moved to the sink at the end of 510. Of course, the logical block must be obtained from the NVRAM if the flag in the third column of the transfer table has been set.

What happens next depends on whether the logical block just transferred was retrieved from the NVRAM, as indicated by the test at 512. If the logical block just transferred was obtained from a physical block, that physical block is now empty and must receive its new logical block from the appropriate source; this is accomplished by the return to 510 when the test at 512 yields a NO result. On the other hand, if the logical block just transferred was retrieved from the NVRAM, all physical blocks that have participated in the transfers up to this point contain the right logical blocks for wear leveling, and the wear-leveling process for the remaining physical blocks begins with a return to 506. Eventually, it will be found upon one of these returns to 506 that the transfer table is empty (all transfers have been performed), in which case the test at 506 yields a YES result and the processing terminates at 514.

The algorithm shown in FIG. 5 generates the best possible assignment of logical blocks to physical blocks for the purpose of wear leveling. However, the number of transfers required to achieve this optimal assignment may be excessive; in particular, these overhead transfers may add significantly to the wear on the device. Of course, the wear-leveling event could be terminated at any time that the test at 512 yields a YES result, but there can be no guarantee that the transfers performed up to that point will be sufficient (e.g., the second most worn block could still contain an active logical block).

Figure 6:
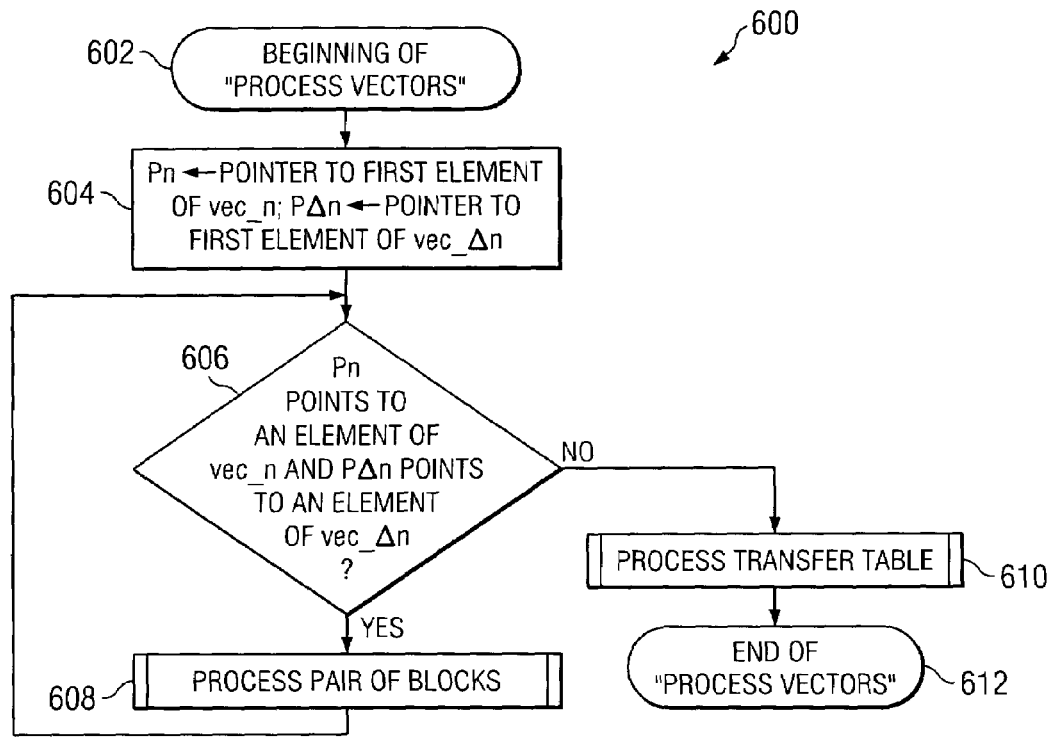
FIG. 6 shows another possible expansion of the "process vectors" step 308 in FIG. 3.

These considerations motivate the alternative approach that is shown at 600 in FIG. 6. Like the algorithm in FIG. 5, the algorithm in FIG. 6 is a method for performing the vector processing that is called for at step 308 in FIG. 3. This new method does not achieve the best possible assignment of logical blocks to physical blocks, but it offers the ability to terminate processing when an effective degree of wear leveling has been achieved with an acceptable amount of overhead wear.

In the method shown in FIG. 6, processing starts at the beginning of the vectors vec_n and vec_$\Delta$n and proceeds systematically toward the end of the two vectors. The position in the two vectors at any given time is indicated by pointers into the vectors: a pointer named Pn points to an element of vec_n, and a pointer called P$\Delta$n points to an element of vec_$\Delta$n. For each combination of Pn and P$\Delta$n that is encountered in the course of the processing, the block descriptors that are referenced by the associated elements of vec_n and vec_$\Delta$n are compared. The contents of the two referenced physical blocks (i.e., the logical blocks that are stored in the two physical blocks that are described by the two block descriptors being compared) are exchanged ("swapped") when the comparison indicates that this exchange will be conducive to wear leveling. After the comparison of the two block descriptors (and the swap, if one was performed), at least one of the pointers Pn and P$\Delta$n is reset ("incremented") to point to the next element of its associated vector (or beyond its associated vector if it was pointing to the last element), and then the new pair of block descriptors is processed (unless a test indicates that processing is to be terminated).

Thus, after the algorithm at 600 has been entered at 602, Pn and P$\Delta$n are set to point to the first elements of their respective vectors at 604. At 606 a test is performed to determine whether processing is to continue or whether it is to be terminated. In the particular implementation shown in FIG. 6, the test shown at 606 determines whether Pn and P$\Delta$n both point to elements of their respective vectors. A NO result for this test means that the last element of at least one of the vectors has been processed (and the subsequent incrementing of the associated pointer has caused it to point beyond the end of the vector), and so processing must terminate. An implementation designed to avoid excessive wear overhead can use a different test at 606 in order to terminate processing at an earlier stage. This will be discussed after the current approach to wear leveling has been explained in greater depth.

If the test at 606 yields a YES result, indicating that processing should continue, the block descriptors that are referenced indirectly by Pn and P$\Delta$n (recall that each of these pointers is a pointer to a vector element which is a pointer to a block descriptor) are compared, a swap of logical blocks is performed if the comparison indicates that this would promote wear leveling, and at least one of the pointers Pn and P$\Delta$n is reset to point to the next element of its associated vector. All this is included in step 608, the details of which are described below. The test at 606 is then repeated, with a YES result leading to the processing of another pair of block descriptors at 608 and a NO result leading to some final processing at 610 (explained below) followed by termination of processing at 612.

At this point it is necessary to clarify what is meant by a swap of logical blocks. There are two types of swaps to be considered: logical and physical. In a physical swap, the logical blocks stored in two physical blocks are actually exchanged. This is done by copying both logical blocks into controller memory (preferably the non-volatile memory 126 in FIG. 1) and then writing these logical blocks to their new locations in the flash memory 100 (each logical block being written to the physical block formerly occupied by the other logical block).

In a logical swap, the exchange of the two logical blocks does not actually occur, but a record is kept of the data movements involved in the swap. This is an important technique because a given logical block may be involved in a number of swaps during the execution of 600. Instead of moving the same logical block multiple times, it is better to keep track of the current destination of each logical block, to update this destination whenever the given logical block is involved in another logical swap, and to actually move the logical block only once, when its final destination is known.

The use of logical swaps during the execution of 600 will now be described in greater detail. The necessary record keeping is done in a logical-block table with three entries for each logical block that is to be moved: the block ID of the logical block, the current location of the logical block (i.e., the physical block where the logical block is stored), and the future location of the logical block. Note that this method requires the block descriptor to include the block ID of the logical block that is stored in the physical block.

When a comparison of two block descriptors at 608 indicates that swapping the contents of the two physical blocks would be conducive to wear leveling, two rows in the logical-block table must be created or modified, one row for each logical block involved in the swap. If a logical block to be moved does not yet appear in the table (that is, if the block ID of this logical block does not yet appear in the table), a new row is created listing the block ID of the logical block, the physical block where it is currently stored, and the physical block to which it is to be moved during the swap. If the logical block to be moved already appears in the table, only its future location is modified.

Thus, the logical-block table is built during the executions of step 608 that discover opportunities for wear-leveling swaps. When the test at 606 indicates that the processing of the vectors is to be terminated, this logical-block table is just like the transfer table of FIG. 5 except that it has an additional column (the column containing the block IDs of the logical blocks that are to be moved). This additional column serves no further purpose and can henceforth be ignored. The two remaining columns of the logical-block table constitute the transfer table for this implementation of the invention. To move each logical block to its destination (the resultant of all the logical swaps in which the logical block was involved), this transfer table is processed at step 610 according to the algorithm given in FIG. 5 (starting at 506 and ending at 514).

If each swap that is found to be conducive to wear leveling at step 608 is executed physically, no transfer table is constructed and step 610 is skipped. To avoid unnecessary wear, it is preferable to treat each swap at step 608 as a logical swap and to process the resulting transfer table at step 610. With this understood, it will not be necessary to distinguish between physical and logical swaps in the following explanations.

Figure 7:
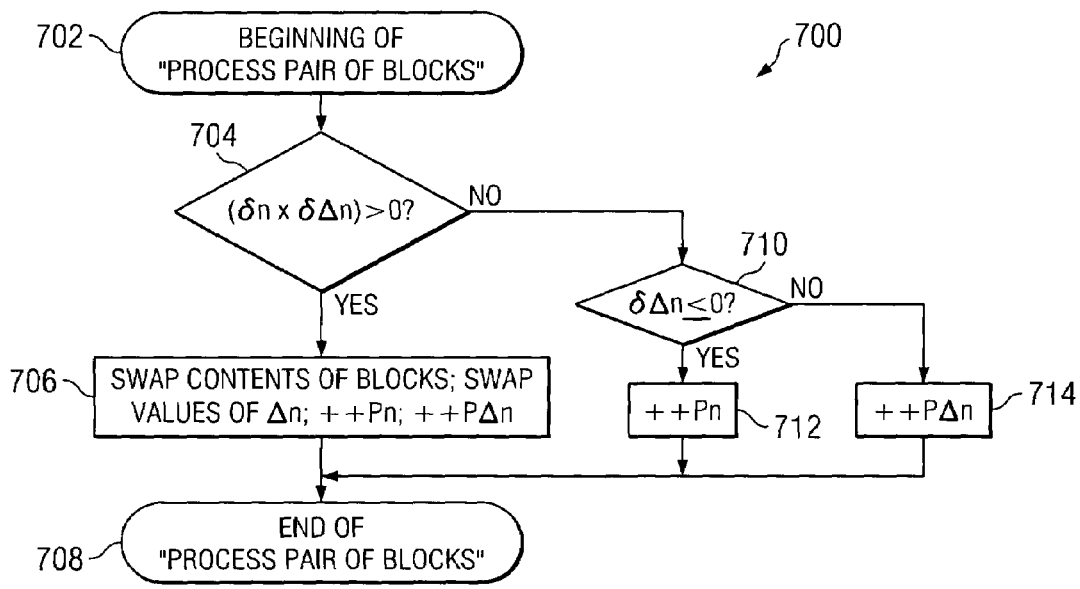
FIG. 7 shows an expansion of the "process pair of blocks" step 608 in FIG. 6.

The details of the "process pair of blocks" step 608 are shown at 700 in FIG. 7. This processing involves a block descriptor that is referenced by an element of vec_n (specifically, the element of vec_n to which Pn currently points) and a block descriptor that is referenced by an element of vec_$\Delta$n (specifically, the element of vec_$\Delta$n to which P$\Delta$n currently points). To compare the values of n and $\Delta$n in these two block descriptors, the quantities $\delta$n and $\delta\Delta$n are defined: $\delta$n is the difference between the two values of n for each respective block of the pair of blocks, and $\delta\Delta$n is the difference between the two values of $\Delta$n for each respective block of the pair of blocks. Specifically, $\delta$n is the value of n in the block descriptor that is referenced by the element of vec_n to which Pn points minus the value of n in the block descriptor that is referenced by the element of vec_$\Delta$n to which P$\Delta$n points; similarly, $\delta\Delta$n is the value of $\Delta$n in the block descriptor that is referenced by the element of vec_n to which Pn points minus the value of $\Delta$n in the block descriptor that is referenced by the element of vec_$\Delta$n to which P$\Delta$n points.

The first step after process 700 is entered at 702 is the test at 704, which determines whether the product of $\delta$n and $\delta\Delta$n is positive. If this product is positive, either $\delta$n and $\delta\Delta$n are both positive or they are both negative. In either case, the physical block with the larger value of n is also the physical block with the larger value of $\Delta$n; that is, the more worn physical block is also the physical block that contains the more active logical block, and wear leveling can be accomplished by swapping the contents of the two blocks. This swapping is shown at 706, which is executed if the product of $\delta$n and $\delta\Delta$n is positive.

It is to be noted that the logic of 704 and 706 would remain valid for any ordering of the two vectors. In fact, the vector concept is not even necessary if one would be satisfied with an inefficient method for wear leveling: one could pick pairs of block descriptors at random, perform the test indicated at 704, and swap the contents of the two physical blocks if the test at 704 yielded a YES result.

It is the ordering of the elements of the vectors vec_n and vec_$\Delta$n that makes efficient wear leveling possible. The first elements of the two vectors will illustrate this point. The first element of vec_n points to the block descriptor with the largest value of n, while the first element of vec_$\Delta$n points to the block descriptor with the smallest value of $\Delta$n. It is therefore guaranteed that the most worn physical block will receive the least active logical block as a result of the first execution of 608 during each wear-leveling event. The only exceptions occur when the two first block descriptors being compared have the same values of n and/or the same values of $\Delta$n, in which case swapping is pointless and would not occur (since the product of $\delta$n and $\delta\Delta$n would not be positive).

To continue the explanation of step 706, it is noted that when the contents of two physical blocks are swapped, the values of $\Delta$n in their respective block descriptors should also be swapped since $\Delta$n measures the activity of the logical blocks stored in the physical blocks. This is necessary because each physical block (or rather a pointer to its block descriptor) appears in both vec_n and vec_$\Delta$n. A physical block that receives a new logical block in a swap may therefore be encountered in a later execution of 700; the activity level of its current contents should be characterized with the correct value of $\Delta$n so that $\delta\Delta$n will be given its correct value at this later execution of 700.

When the contents of two physical blocks have been swapped (logically or physically), and the values of $\Delta$n in their respective block descriptors have also been swapped (regardless of whether the logical blocks were swapped logically or physically), the processing of the pair of block descriptors is complete. The pointers Pn and P$\Delta$n are then modified to prepare for the processing of the next pair of block descriptors. Specifically, Pn is incremented so that it points to the next element of vec_n (or beyond vec_n if Pn was pointing to the last element of vec_n); this is the meaning of ++Pn in 706. Similarly, P$\Delta$n is incremented so that it points to the next element of vec_$\Delta$n (or beyond vec_$\Delta$n if P$\Delta$n was pointing to the last element of vec_$\Delta$n); this is the meaning of ++P$\Delta$n in 706. After 706, the logic flow moves to 708, which signals the conclusion of one execution of step 608 in FIG. 6.

So far one path through the "process pair of blocks" operation 700 has been described, namely, the path that discovers an opportunity for wear leveling and acts on this opportunity at 706 by swapping the contents of two physical blocks. Now the other paths through 700 will be described.

When the test at 704 yields a NO result, swapping the contents of the two physical blocks currently being compared is not conducive to wear leveling. One way to handle this case would be to increment both vector pointers (++Pn and ++PΔn, as in 706), so that the next execution of 700 will involve an entirely new pair of physical blocks. However, it is preferable to increment only one of the vector pointers, since one of the physical blocks presently being considered may yet offer an opportunity for wear leveling when it is compared with a different block. The choice of which vector pointer to increment is based on an appraisal of which of the two current block descriptors is more likely to provide an opportunity for a wear-leveling swap when it is compared with the next block descriptor in the other vector. The two possibilities will now be explained.

Borderline cases in which either δn or δΔn is zero will not be considered. A NO result for the test at 704 then implies that δn and δΔn have opposite signs. There are therefore two cases to be considered: (a) δn is positive while δΔn is negative (so that the test at 710 yields a YES result and step 712 is executed) and (b) δn is negative while δΔn is positive (so that the test at 710 yields a NO result and step 714 is executed). The latter case will be explained first.

Let PB_n denote the physical block whose descriptor is referenced by Pn, and let PB_Δn denote the physical block whose descriptor is referenced by PΔn. If δn is negative, PB_Δn is more worn than PB_n. Owing to the order in which vec_n is sorted, this will remain true if Pn is incremented to point to the next element of vec_n. In a wear-leveling swap, PB_Δn must therefore receive a logical block that is less active than the logical block it currently holds. However, it is known that PB_Δn already contains a logical block whose activity is a reasonable match for the amount of wear that PB_Δn has experienced. This is because PB_Δn has already been encountered in vec_n in an previous execution of 700 (this follows from the order in which vec_n is sorted and the fact that δn is negative), and at that time the block that is now PB_Δn was compared with a physical block that was as close as possible to the beginning of vec_Δn (and therefore had a value of Δn that was as small as possible). For this reason, the pairing of PB_Δn with any subsequent physical block in vec_n is not likely to offer a good opportunity for a wear-leveling swap. The pointer PΔn should therefore be incremented, and this is indicated at 714.

In the other case to be considered, δn is positive while δΔn is negative: PB_n is more worn than PB_Δn, but the logical block stored in PB_n is less active than the logical block stored in PB_Δn. Swapping the contents of PB_n and PB_Δn will not promote wear leveling. Instead, step 712 indicates that the appropriate action is to skip PB_n by incrementing the pointer Pn. This decision is based on the judgment that a suitable swapping partner for PB_n is unlikely to be found in subsequent elements of vec_Δn. The basis for this judgment will now be explained.

First, it will not be possible to find a less active logical block for PB_n: the order in which vec_Δn is sorted shows that δΔn will remain negative if PΔn is incremented. An exception to this rule occurs when a value of Δn has been modified by a swap that occurred earlier in the wear-leveling event. However, a less-active logical block that is encountered in this way in vec_Δn will be stored in a block with a higher value of n (since the swap that caused the change of Δn occurred when Pn pointed to a previous element of vec_n), and so a swap would not be conducive to wear leveling in this case.

Second, a wear-leveling swap in which PB_n receives a logical block that is more active than its current logical block is also not a promising prospect. In a wear-leveling swap, such a logical block would have to come from a physical block that is more worn than PB_n, and this physical block would have to receive from PB_n a logical block that is less active than its current contents. But any block that is more worn than PB_n has been encountered in vec_n in a previous execution of 700, and has therefore already had a good opportunity to receive a logical block with the least possible activity.

This concludes the explanation of why the block PB_n is skipped (by incrementing the pointer Pn) at 712, which is executed when δn is positive and δΔn is negative.

The vector-pointer adjustments performed at steps 706, 712, and 714 have now been explained. After the appropriate adjustment, the processing of the pair of blocks concludes at 708. If both vector pointers still point to elements within their respective vectors, the test at 606 in FIG. 6 yields a YES result, and the resulting execution of step 608 will entail a return to 702 in FIG. 7.

The algorithm shown in FIG. 7 can be summarized as follows. The logic leading up to 712 and 714 attempts to maximize the opportunities for wear-leveling swaps that are encountered as the vectors vec_n and vec_Δn are traversed during the execution of the loop controlled by the test at 606 in FIG. 6. These opportunities are detected by a YES result for the test at 704, and the swaps are performed at 706. The sorting orders of the vectors vec_n and vec_Δn maximize the productivity of these swaps since physical blocks with large values of n tend to be paired with blocks with low values of Δn (near the beginning of the vectors vec_n and vec_Δn, respectively), while blocks with small values of n tend to be paired with blocks with high values of Δn (near the end of the two vectors).

FIGS. 3, 6, and 7 constitute one embodiment of the present invention, with each succeeding figure providing the details of a step in the figure that precedes it. In this particular embodiment, the only technique that is used to minimize overhead wear (wear on the device caused by the wear-leveling process itself) is the technique of logical swaps. Two different methods for further reducing overhead wear will now be described. The first method to be described is a modification of FIG. 7, and the second is a modification of FIG. 3. These two methods and the method of logical swaps can be employed individually or in any combination.

Although the sorting orders of the vectors are intended to maximize the productivity of swaps, a YES result for the test at 704 in FIG. 7 does not guarantee that the resulting swap at 706 will make a significant contribution to wear leveling. In particular, the benefit will be minimal if either δn or δΔn is small in absolute value. Such swaps of minimal benefit are likely to increase overhead wear without offering an offsetting benefit. These undesirable swaps can be eliminated with a suitable modification of the test at 704. In particular, the full test at 704 should yield a YES result only if δn and δΔn have the same sign (which is equivalent to δn×δΔn>0, the original condition at 704) and the absolute values of both δn and δΔn are sufficiently large. For example, if Dn denotes the difference between the largest and smallest values of n in the population of physical blocks and if DΔn denotes the difference between the largest and smallest values of Δn, the extension to the test at 704 might require that the absolute value of δn exceed some specific fraction of Dn and the absolute value of δΔn exceed some specific fraction of DΔn.

Figure 8:
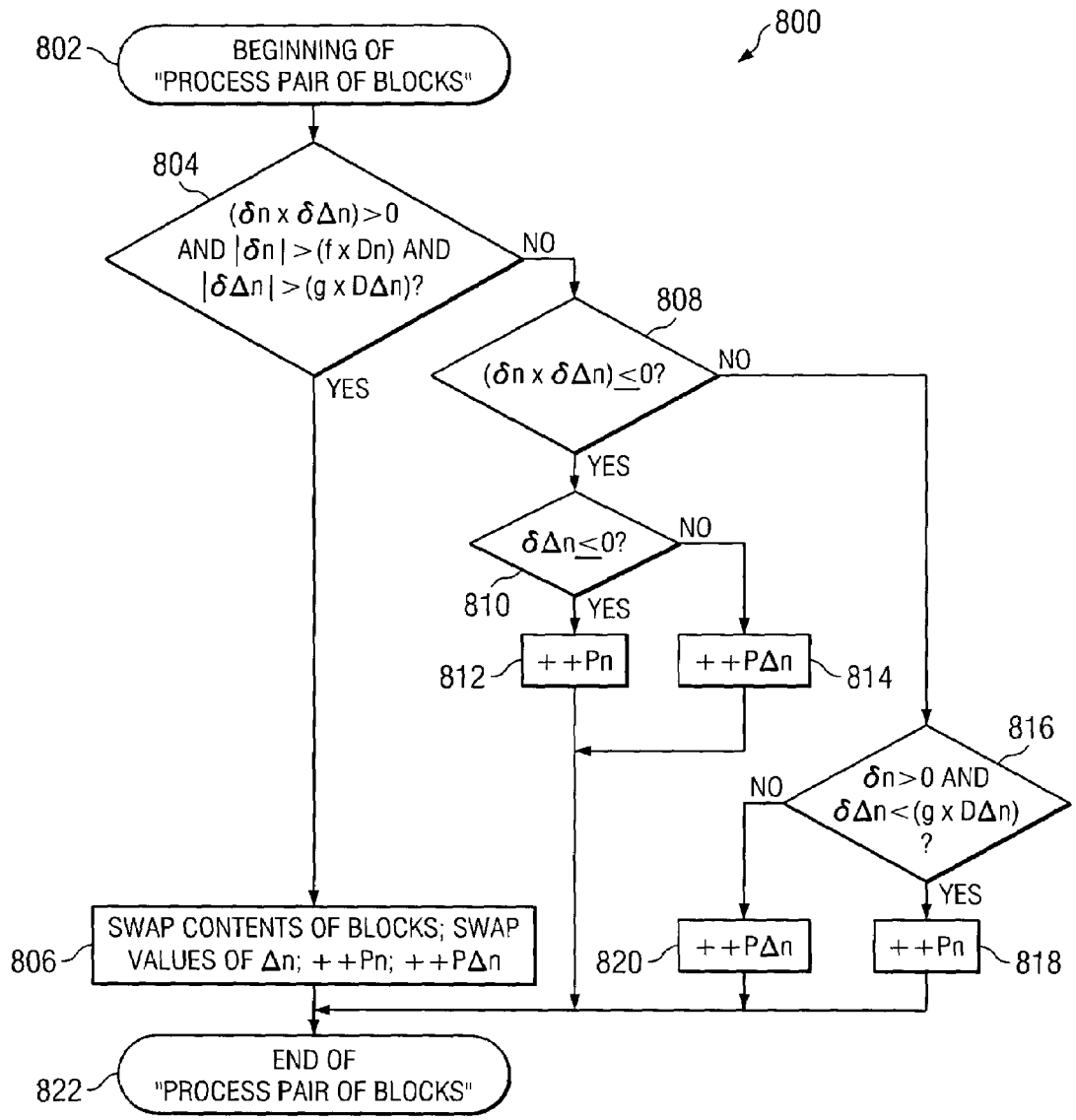
FIG. 8 is an alternate expansion of the "process pair of blocks" step 608 in FIG. 6 that can be used in place of the version shown in FIG. 7.

An alternative to 700 that avoids swaps of marginal value is shown at 800 in FIG. 8. The test at 804 shows the modification to 704 just described, in which the absolute values of δn and δΔn must both meet appropriate minimum size requirements for a swap to be performed at 806; the parameters f and g in 804 are numbers between 0 and 1 whose precise values depend on the desired degree of filtering. If δn and δΔn do not have the same sign or if at least one of these quantities does not meet the minimum size requirement, the test at 804 yields a NO result, and one of the vector pointers is incremented at 812, 814, 818, or 820. Steps 812 and 814 correspond exactly to steps 712 and 714, respectively, of FIG. 7; that is, the incrementation of Pn at 812 occurs when δn×δΔn≦0 and δΔn≦0, which is precisely when Pn is incremented at 712, and the incrementation of PΔn at 814 occurs when δn×δΔn≦0 and δΔn>0, which is precisely when PΔn is incremented at 714. However, steps 818 and 820 are new; one of them is executed when a swap would be conducive to wear leveling (the NO result for the test at 808 means that δn and δΔn have the same sign) but is avoided because at least one of the size conditions imposed at 804 is not satisfied. Whether 818 or 820 is executed depends on the outcome of the test at 816, which will now be explained.

First, it is to be noted that the test at 816 yields a YES result when δn and δΔn are both positive but δΔn is small. The requirement that δΔn be positive is not mentioned explicitly at 816, but follows from the NO result for the test at 808 together with the requirement that δn be positive.

The rationale that was given above to justify step 712 when δn is positive but δΔn is negative also applies when δn is positive and δΔn is positive but small. It follows that Pn should be incremented (as it is at 712) when the test at 816 yields a YES result, and this is indicated at 818.

It remains to be shown that PΔn should be incremented when the test at 816 yields a NO result. The test at 816 yields a NO result in two cases: if δn is negative (violating the first condition in 816) or if δΔn is not small (violating the second condition in 816). If δn is negative (the first case), the rationale that was given above to justify step 714 when δn is negative continues to apply, and so PΔn should be incremented. If δn is positive but δΔn is not small (the second case), it follows from the NO results for the tests at 804 and 808 that δn must be small (that is, the middle condition at 804 must be violated). Owing to the order in which vec_n is sorted, incrementing Pn can only decrease δn. As long as δn remains positive, no swap will be done owing to smallness of δn. If δn becomes negative, the rationale for 714 applies once again, and so PΔn should be incremented. This concludes the rationale for step 820, which increments PΔn when the test at 816 yields a NO result.

Figure 9:
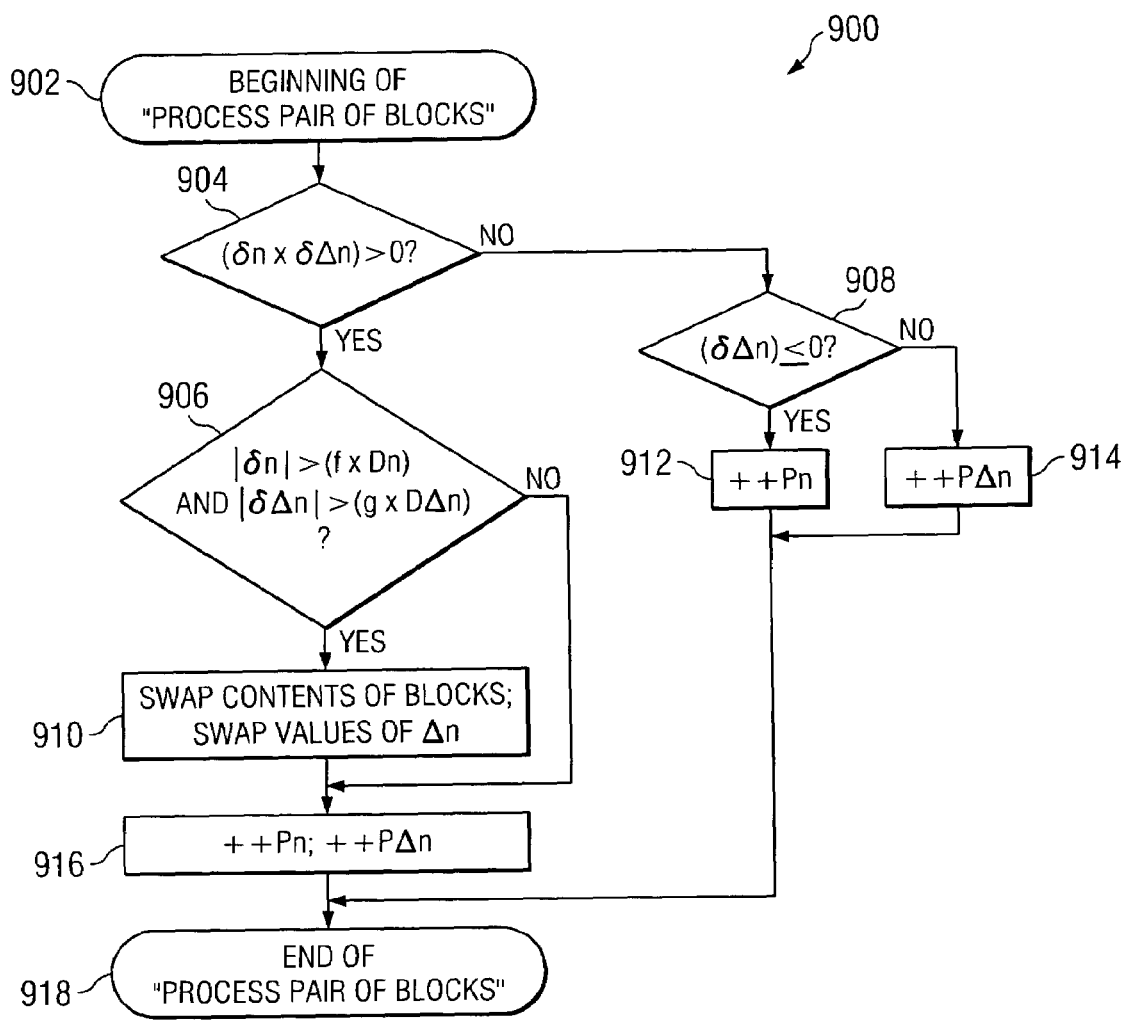
FIG. 9 is an alternate expansion of the "process pair of blocks" step 608 in FIG. 6 that can be used in place of the versions shown in FIGS. 7 and 8.

As has already been explained, 800 may be preferred over 700 because it reduces overhead wear by eliminating swaps in which δn or δΔn is small in absolute value. It is to be noted that this can be accomplished in ways other than that shown at 800. In the method shown at 900 in FIG. 9, for example, the test at 704 (FIG. 7) is left unchanged at 904, and the magnitudes of δn and δΔn are examined in a separate test at 906. This approach is equally effective as the one shown at 800 (FIG. 8) in eliminating the swaps of marginal value. However, since both pointers are incremented at 916 when such swaps are encountered instead of just one pointer being incremented under these conditions at 818 or 820, the approach at 900 may miss opportunities for productive swaps that are captured by the approach at 800.

A different method for reducing overhead wear will now be explained. When the vectors vec_n and vec_Δn are processed by moving through them systematically from beginning to end, as shown in FIG. 6, the higher-level organization of a wear-leveling event that is shown in FIG. 3 can be modified to achieve an effective degree of wear leveling with less overhead wear (that is, with fewer movements of logical blocks). Such a modification is shown at 1000 in FIG. 10. The concepts required for this modification will now be explained.

Figure 10:
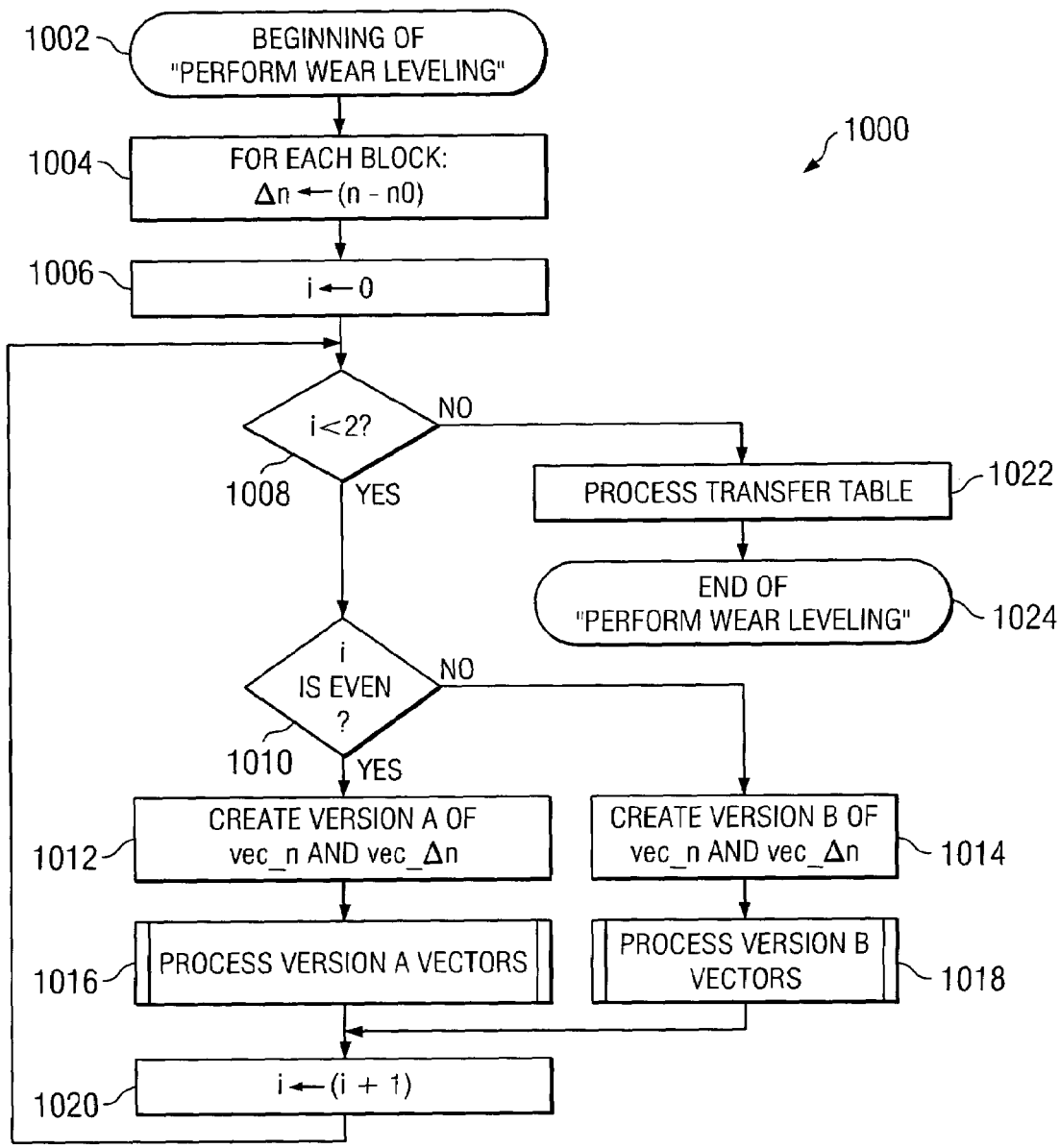
FIG. 10 is an alternate expansion of the "perform wear leveling" step 208 in FIG. 2 that can be used in place of the version shown in FIG. 3.

The first concept needed to understand FIG. 10 is the reversal of sorting orders. Up to this point it has been assumed that the vectors vec_n and vec_Δn are created by sorting the block-descriptor pointers in decreasing order of n and in increasing order of Δn, respectively. However, the method of this invention also works if the sorting order of each vector is reversed, since this transformation does not alter the essential correlation between the value of n in PB_n and the value of Δn in PB_Δn, namely, that a high value for one of these variables tends to be associated with a low value for the other. The only algorithmic change that is required in order to process the vectors sorted in this way is that each appearance of ++Pn in FIGS. 7, 8, and 9 should be replaced with ++PΔn, and vice versa; that is, Pn should be incremented in 714, 814, 820, and 914 while PΔn should be incremented in 712, 812, 818, and 912.

The second concept needed to understand FIG. 10 is iterative vector processing. The systematic traversal of the vectors that is described in FIG. 6 (in conjunction with an appropriate expansion of step 608, such as 700, 800, or 900), will achieve a certain degree of wear leveling, but the resulting mapping of logical blocks to physical blocks will not generally be the best possible. Improved results can be achieved by iteration: after the vectors have been processed (but before the transfer table is processed in the case of logical swaps), vec_Δn is sorted again (since some physical blocks now have different values of Δn as a result of the swaps) and then the two vectors (vec_n and vec_Δn) are processed again. This may be repeated any number of times. If swaps have been performed logically, the transfer table is processed (that is, the logical blocks are physically moved) after the completion of the desired number of iterations.

Iterative vector processing can be combined with the reversal of sorting orders. After a traversal of the vectors sorted in one order, both vec_n and vec_Δn are sorted in the reverse order before they are traversed again.

The last concept needed to understand FIG. 10 is truncated vector processing. According to the test shown at 606 in FIG. 6, processing continues until one of the pointers Pn or PΔn no longer points to an element of its associated vector. However, the test shown at 606 can be replaced with another test that will terminate vector processing at an earlier stage. A few possibilites are: a new test at 606 could yield a NO result when the number of times that step 608 has been executed reaches some predetermined value (perhaps specified as some fraction of the total number of physical blocks); or the new test could yield a NO result when the value of n for PB_n passes some predetermined percentage of the mean value of n for all the physical blocks; or the new test could yield a NO result when the number of rows in the logical-block table (and therefore the number of logical blocks that must be moved at step 610) reaches some predetermined value; and so on. Alternatively, the vectors vec_n and vec_Δn could be generated with partial sorts (so that, in the sorting order assumed in most of this discussion, vec_n and vec_Δn contain only the physical blocks with the k largest values of n and the k smallest values of Δn, respectively, for some value of k). In the latter approach, vector processing is truncated (that is, it is terminated before all the pairs of block descriptors have been processed) by building shortened versions of the vectors, without changing the test that is shown at 606.

The concepts of reversal of sorting orders, iterative vector processing, and truncated vector processing can be employed individually and in various combinations. One combination of particular interest is motivated by the following observation: the wear-leveling operations of greatest importance involve either (a) the movement of the least-active logical blocks into the most-worn physical blocks or (b) the movement of the most-active logical blocks into the least-worn physical blocks. How the logical blocks of intermediate activity are distributed over the physical blocks that have experienced intermediate amounts of wear is of lesser importance as long as the difference in wear between the most worn and least worn blocks is sufficiently small. It follows that unnecessary data movement (and therefore unnecessary wear overhead) can be avoided if the middle portions of the vectors are not processed.

One way to process both ends of the vectors without processing the middle is as follows: create the vectors vec_n and vec_Δn as originally defined (sorted in decreasing order of n and increasing order of Δn, respectively); perform a truncated processing of this pair of vectors; re-sort vec_n and vec_Δn into reverse order (increasing order of n and decreasing order of Δn, respectively); and perform a truncated processing of this new pair of vectors. The truncated processing of the first pair of vectors moves the least-active logical blocks into the most-worn physical blocks; the truncated processing of the second pair of vectors moves the most-active logical blocks into the least-worn physical blocks. It is this combination of reversal of sorting orders, iterative vector processing, and truncated vector processing that is shown at 1000 in FIG. 10.

When this organization of the wear-leveling event is used (instead of that shown in FIG. 3), the wear-leveling routine is entered at 1002, and the value of Δn for each physical block is computed at 1004 and recorded in the block descriptor. Step 1006 initializes to zero a variable i that is used to keep track of the number of iterations that have been performed. The test at 1008 compares the current value of i with the total number of iterations to be performed. Since the value of i is zero the first time test 1008 is encountered, this test yields a YES result, and the value of i is tested again at 1010. The test at 1010 determines whether the value of i is odd or even. Since i is even (zero) at this point, the test at 1010 yields a YES result, and so steps 1012 and 1016 are executed. The notation "version A" in these steps refers to the vectors vec_n and vec_Δn in their original sorting orders. The version-A vectors are created at 1012 and processed at 1016. With one exception, the processing at 1016 is identical to that shown at 600 in FIG. 6 (together with 700, 800, or 900). The exception is that the transfer table is not processed at this time, so that step 610 in FIG. 6 is skipped.

After the completion of step 1016, the value of i is incremented at 1020 and tested again at 1008. As the current value of i (1) is still less than 2, test 1008 again yields a YES result, and the test at 1010 is encountered once more. This time i is odd, so test 1010 yields a NO result, and so steps 1014 and 1018 are executed. The notation "version B" in these steps refers to the vectors vec_n and vec_Δn sorted in reverse order. The version-B vectors are created at 1014 (by re-sorting the vectors vec_n and vec_Δn) and processed at 1018. With two exceptions, the processing at 1018 is identical to that shown at 600 in FIG. 6 (together with 700, 800, or 900). One exception is the same as that noted for step 1016: the transfer table is not processed at this time (step 610 of FIG. 6 is skipped). The other difference is that ++Pn and ++PΔn, wherever they appear in 700, 800, and 900, are interchanged to account for the reversed sorting orders of vec_n and vec_Δn.

After the completion of step 1018, the value of i is incremented once more at 1020 and tested again at 1008. As the value of i has now reached 2, test 1008 yields a NO result, indicating that no more iterations are to be performed. The transfer table constructed during the vector processing is itself processed at 1022 (i.e., the logical blocks in the logical-block table are moved to their destination physical blocks), as previously described. The wear-leveling event then terminates at 1024.

Several remarks must be made in connection with FIG. 10. The organization of a wear-leveling event that is shown in FIG. 10 is motivated by the desire to process only the beginning and ending portions of the vectors vec_n and vec_Δn in order to minimize unnecessary wear associated with relatively unproductive relocations of logical blocks. Truncation of vector processing is therefore essential, but this truncation is not explicit in FIG. 10. It is to be understood that either the vectors vec_n and vec_Δn are created at 1012 and 1014 in abbreviated form by partial sorts, or the test at 606 in FIG. 6 is replaced with a test that will terminate processing at a suitable stage (before the middle portions of the vectors are reached), as previously described.

The wear-leveling event described in FIG. 10 involves two iterations of vector processing, with the vectors sorted in reverse order in the second iteration. The purpose of the two iterations is to process different ends of the vectors. But the concept of iterative vector processing was introduced as a method for improving wear-leveling results by repeated processing of the same vectors (or portions of vectors). This method can be incorporated in FIG. 10 simply by replacing the value 2 in the test at 1008 with a larger number. For example, if the test at 1008 were "i<4?" instead of "i<2?", both ends of the vectors would be processed twice.

The iteration shown in FIG. 10 is not the only way to process both ends of the vectors without processing the middle portions. This can also be accomplished using the simpler organization shown in FIG. 3 provided suitable changes are made to the organization of vector processing that is shown in FIG. 6. However, the iterative process shown in FIG. 10 may be the simplest approach, and the re-sorting of the vectors between iterations may improve results since the re-sorting of vec_Δn takes into account changes in Δn due to logical swaps performed during the first iteration.

Thus, a technique has been described for leveling the wear of a non-volatile integrated circuit device that will increase the life of the device by monitoring storage patterns of the device and relocating certain data to other storage locations based on the activity level of the data and the cumulative wear of the storage locations. Sorted lists or vectors are used to keep track of memory storage usage patterns. These lists/vectors facilitate the identification of promising opportunities for wear leveling. Logical blocks that are infrequently erased/written can be moved into physical blocks that have received a lot of wear, while logical blocks that are frequently erased/written can be moved into physical blocks that have received little wear, thereby leveling the future wear of the individual physical blocks within the flash memory device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing data in a memory device having a plurality of blocks, comprising the steps of:
   maintaining a first vector having block entries sorted in order of number of overall block modifications for each block of the plurality of blocks;
   maintaining a second vector having block entries sorted in order of number of block modifications since a previous wear-leveling event;
   using the first vector and the second vector to determine which of the plurality of blocks should have its associated data relocated to another block;
   wherein the using step comprises the steps of:
   (i) determining which of a first given block associated with an entry in the first vector and a second given block associated with an entry in the second vector is more physically worn;
   (ii) determining which of the first given block and the second given block is more active;
   (iii) if either one of the first given block and the second given block are both the more physically worn block and the more active block, updating a swap table to indicate that contents of the first given block should be swapped with contents of the second given block;
   (iv) repeating steps (i)–(iii) for each block entry in at least the first vector;
   (v) re-sorting the second vector such that the blocks associated with the block entries contained therein are sorted in order of number of block modifications since a previous wear-leveling event;
   (vi) repeating steps (i)–(iv) for the re-sorted second vector;
   (vii) swapping blocks according to the swap table; and
   wherein in step (v) the second vector is sorted in reverse order from the order in which it was originally sorted in and, in addition, the first vector is also re-sorted in reverse order from the order in which it was originally sorted in.

2. The method of claim 1, wherein the first vector is sorted in descending order of overall block usage and the second vector is sorted in ascending order of block usage since the previous wear level event.

3. The method of claim 1, wherein the first vector is sorted in ascending order of overall block usage and the second vector is sorted in descending order of block usage since the previous wear level event.

4. The method of claim 1, wherein the block entries for the first and second vectors each comprise a pointer to a block descriptor for each of the plurality of blocks.

5. The method of claim 4, wherein each said block descriptor maintains a modification count for its respective block.

6. The method of claim 5, wherein the modification count comprises a count of total overall modifications (n count) for its respective block and total modifications since a previous wear-leveling event ($\Delta n$ count) for the respective block.

7. The method of claim 6, wherein the n count for a first given block in the first vector is compared to the n count for a second given block in the second vector to determine which of the first and second blocks is more physically worn, and wherein the $\Delta n$ count for the first given block in the first vector is compared to the $\Delta n$ count for the second given block in the second vector to determine which of the first and second blocks is more active, and further comprising the step of swapping contents of the first given block with the second given block if either of the first given block and second given block are both the more physically worn block and the more active block.

8. The method of claim 1, wherein the using step comprises the step of copying data contained in a block having higher usage to a block having lower usage.

9. The method of claim 8, further comprising the step of copying data contained in a block having lower usage to a block having higher usage.

10. The method of claim 1 wherein the block modifications are at least one of erasing blocks and writing blocks.

11. The method of claim 1, wherein the step of using the first vector and the second vector comprises the steps of:
   determining which of a first given block associated with an entry in the first vector and a second given block associated with an entry in the second vector is more physically worn;
   determining which of the first given block and the second given block is more active; and
   swapping contents of the first given block with contents of the second given block if either of the first given block and the second given block are both the more physicall worn block and the more active block.

12. The method of claim 11, wherein the more physically worn determining step and the more active determining step are repeated for a plurality of blocks associated with entries in the first and second vectors, and wherein the swapping step is deferred until each of the plurality of blocks associated with each of the first and second vectors have been processed.

13. A system for managing data in a memory device having a plurality of blocks, comprising:
   a first vector having block entries sorted in order of number of overall block modifications for each block of the plurality of blocks;
   a second vector having block entries sorted in order of number of block modifications since a previous wear-leveling event;
   means for using the first vector and the second vector to determine which of the plurality of blocks should have its associated data relocated to another block;
   wherein the using comprises:
   (i) means for determining which of a first given block associated with an entry in the first vector and a second given block associated with an entry in the second vector is more physically worn;
   (ii) means for determining which of the first given block and the second given block is more active;
   (iii) means for if either one of the first given block and the second given block are both the more physically worn block and the more active block, updating a swap table to indicate that contents of the first given block should be swapped with contents of the second given block;

(iv) means for repeating (i)–(iii) for each block entry in at least the first vector;

(v) means for re-sorting the second vector such that the blocks associated with the block entries contained therein are sorted in order of number of block modifications since a previous wear-leveling event;

(vi) means for repeating (i)–(iv) for the re-sorted second vector;

(vii) means for swapping blocks according to the swap table; and wherein in means for (v) the second vector is sorted in reverse order from the order in which it was originally sorted in and, in addition, the first vector is also re-sorted in reverse order from the order in which it was originally sorted in.

14. The system of claim 13, wherein the first vector is sorted in descending order of overall block usage and the second vector is sorted in ascending order of block usage since the previous wear-leveling event.

15. The system of claim 13, wherein the first vector is sorted in ascending order of overall block usage and the second vector is sorted in descending order of block usage since the previous wear-leveling event.

16. The system of claim 13, wherein the first and second vectors each comprise a pointer to a block descriptor for each of the plurality of blocks.

17. The system of claim 16, wherein each said block descriptor maintains a modification count for each of the plurality of blocks.

18. The system of claim 17, wherein the modification count comprises a count of total overall modifications (n count) for its respective block and total modifications since a previous wear-leveling event ($\Delta n$ count) for the respective block.

19. The system of claim 18, wherein he n count for a first given block in the first vector is compared to the n count for a second given block in the second vector to determine which of the first and second blocks is more physically worn, and wherein the $\Delta n$ count for the first given block in the first vector is compared to the $\Delta n$ count for the second given block in the second vector to determine which of the first and second blocks is more active, and further comprising the step of swapping contents of the first given block with the second given block if either of the first given block and second given block are both the more physically worn block and the more active block.

20. The system of claim 13, further comprising means for copying data contained in a block having higher usage to a block having lower usage.

21. The system of claim 20, further comprising means for copying data contained in a block having lower usage to a block having higher usage.

22. The system of claim 13 wherein the block modifications are at least one of erasing blocks and writing blocks.

23. The system of claim 13, wherein the means for using comprises:

first means for determining which of a first given block associated with an entry in the first vector and a second given block associated with an entry in the second vector is more physically worn;

second means for determining which of the first given block and the second given block is more active; and means for swapping contents of the first given block with contents of the second given block if either of the first given block and the second given block are both the more physically worn block and the more active block.

24. A data storage subsystem comprising a memory controller, system memory and a plurality of flash devices, each flash device organized as a plurality of blocks, wherein the memory controller operates to perform the steps of:

maintaining a first vector having block entries sorted in order of number of overall block modifications for each block of the plurality of blocks;

maintaining a second vector having block entries sorted in order of number of block modifications since a previous wear-leveling event;

using the first vector and the second vector to determine which of the plurality of blocks should have its data located to another block;

wherein the using step comprises the steps of:

(i) determining which of a first given block associated with an entry in the first vector and a second given block associated with an entry in the second vector is more physically worn;

(ii) determining which of the first given block and the second given block is more active;

(iii) if either one of the first given block and the second given block are both the more physically worn block and the more active block, updating a swap table to indicate that contents of the first given block should be swapped with contents of the second given block;

(iv) repeating steps (i)–(iii) for each block entry in at least the first vector;

(v) re-sorting the second vector such that the blocks associated with the block entries contained therein are sorted in order of number of block modifications since a previous ear-leveling event;

(vi) repeating steps (i)–(iv) for the re-sorted second vector;

(vii) swapping blocks according to the swap table; and wherein in step (v) the second vector is sorted in reverse order from the order in which it was originally sorted in and, in addition, the first vector is also re-sorted in reverse order from the order in which it was originally sorted in.

* * * * *